United States Patent Office 3,153,231
Patented Oct. 13, 1964

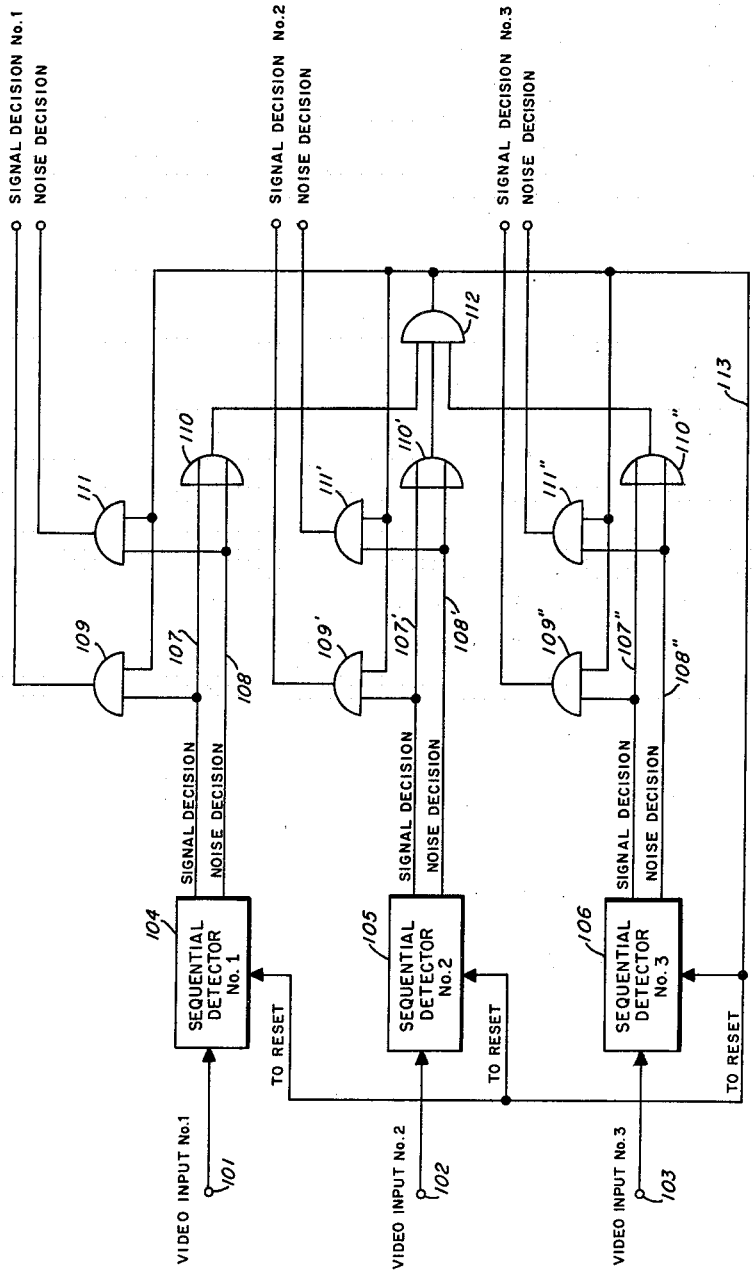

3,153,231
MODIFICATION OF SEQUENTIAL DETECTORS
FOR PARALLEL OPERATION
James W. Caspers, San Diego, and Robin A. Worley, La Jolla, Calif., assignors to the United States of America as represented by the Secretary of the Navy
Filed Oct. 11, 1961, Ser. No. 144,519
7 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

The present invention relates to an improved surveillance system and more particularly, to a surveillance system incorporating modified parallel sequential detectors.

One of the chief advantages of the sequential detectors is the shorter decision time over the best non-sequential or fixed sample detectors. A sequential detector is a device which processes radar, or other data, for signal detection purposes through the use of a sequential sampling scheme rather than through a fixed or predetermined data sample. In contradistinction thereto, a fixed sample or non-sequential detector detects signals on a basis of a fixed number of observations. In a fixed sample detector the number of observations is fixed as well as the antenna scan rate which leads to unnecessary observations being made. The only significant disadvantage of the sequential detector is its random decision time in that the length of time required to make the decision is a random variable. The random properties of the length of decision time result in degraded performance of the sequential detector in certain applications, specifically, radar application where range discrimination is required. The decision time is random or fixed depending on the type of operation that is being performed i.e., the decision time would be random if the sequential detector were allowed to terminate its operation, that is make a decision for noise or signal regardless of the number of sample points chosen. On the other hand, the decision time would be fixed if a decision is made after a predetermined number of samples are made.

Radar or electromagnetic waves in typical radar frequency bands travel in essentially straight lines. Thus, for a given beam position, azimuth and elevation angles being fixed, only targets along this beam at different ranges can be detected. In order to detect targets at different ranges the video signal must be quantized in time or range increments. The video from each of these increments is then fed into a detector and a signal decision therefrom implies a target in the particular range increment. All range increments are usually processed simultaneously for signals in order to facilitate the search process.

The foregoing situation presents no sampling problems in the non-sequential or fixed sample detector if the sample sizes for all ranges are desired to be the same. In that the number of sample points is the same for all ranges, although they are not all necessarily used, this restriction is endured.

However, if sequential detectors are used in the above situation a problem results in that the detectors will usually require different decision times. In addition, the radar beam cannot be moved until the slowest detector reaches a decision. The length of time for the last detector to make a decision is also a random variable and its probability distribution is given by the product of the distribution of all the detectors. This increases the average length of time that the radar beam must remain fixed. The more range increments, more detectors, the greater time the beam must remain fixed. If too many range increments are used the average dwell time will exceed that for the non-sequential detectors and the advantage of ordinary sequential detectors is lost.

In order to obviate the disadvantage, a bank of sequential detectors can be modified and interconnected so as to reduce the foregoing problem. The decision time for all detectors is the same in this arrangement; however, the detection time is still random and not fixed. The modification and connections increase the search rate of the system using the modification, and all collected radar data is used in the arrangement and is not discarded.

An object of the present invention is to improve performance of sequential signal detectors when used in banks.

A further object of the invention is to improve performance of sequential detectors when connected in parallel to increase the search rate of radar systems.

Another object of the present invention is to provide a sequential signal detection system wherein all collected radar data is used.

An additional object of the invention is to provide a sequential signal detection system which utilizes all incoming data without being restricted as to the fixed detection time.

Another object of the invention is to provide a sequential signal detection system wherein all detectors in the system are forced to use all of the radar data.

A further object of the invention is to provide a sequential signal detection system utilizing sequential signal detectors connected in a modified parallel sequence to increase the search rate of the system through forcing all detectors to use all of the radar data.

Various other objects and advantages will appear from the following description of one embodiment of the invention, and the novel features will be particularly pointed out hereinafter in connection with the appended claims.

The invention will be described in greater detail by reference to the following description taken in connection with the accompanying drawings in which the figure is a block diagram of an embodiment of the modified sequential detection system.

The embodiment of the invention set forth in the figure is described in connection with three sequential detectors, however, it is to be understood that any number of sequential detectors and associated terminal equipment may be used as desired.

In the embodiment of the figure video input from radar system receivers selected according to range is coupled to inputs 101, 102, and 103 and thence into a corresponding sequential detector 104, 105 and 106, respectively. The video input referred to is radar data and further is radar video as is ordinarily used and originates in a radar receiver. Each of the sequential detectors 104 through 106 has an output line representing a signal decision output and a noise decision output as at 107 and 108, respectively. The signal decision output on line 107 forms one input to And gate 109 and one input to OR gate 110, while the noise decision output on line 108 forms one input to And gate 111 and also forms one input to OR gate 110. The corresponding output lines and the And and OR gates on sequential detectors 105 and 106 have the ′ and ″ subscript respectively.

The outputs of the respective OR gates 110, 110′ and 110″ form inputs to And gate 112. The output of And gate 112 is coupled to the input terminals on the And gates corresponding to 109 and 111 as an enabling pulse. The output of And gate 109 represents a signal decision which may be utilized at appropriate reproducing equipment, not shown, while the output of And gate 111 represents a decision for noise which is used in appropriate terminal equipment, also not shown. The output of the AND gates may be merely a pulse which is utilized in further processing equipment.

The output of And gate 112 is also coupled back to the sequential detectors 104–106 on line 113 as a reset pulse in order that the sequential detectors 104–106 may be reset upon a decision being had at all of the outputs of the sequential detectors 104–106.

In order to explain the operation of the present invention the unmodified sequential detector will be considered. Suppose that each detector is adjusted to some true/false alarm, $\alpha$, and miss probability, $\beta$, which is done by setting the decision bounds. The decision bounds are in reality two bounds. The decision bound is an upper and lower bound which is fixed for the operation to be performed. When the upper bound is exceeded a decision for signal comprises the output of the system and when the lower bound is exceeded a decision for noise is made. If the detectors are then interconnected, as shown in the figure, at each sample the detectors make the required computation and comparison with the decision bounds and when the first detector 104 reaches either decision bound it provides an output indication of either signal or noise. However, the detector of the figure, detector 104 is not reset nor does this output decision appear external to the detector bank. Sampling and processing continue until all detectors, i.e., 104–106 jointly and simultaneously have decision outputs. At this time the decision process ends and all decisions are read out for ultimate use in that And gate 112 enables the And gates 109, 109', 109" and And gates 111, 111' and 111" to pass the signal decision and noise decision pulses to the appropriate terminal equipment. The detectors are then reset through line 113 to the initial state. Each detector, except the last one to make a decision is forced to continue until a decision is made by all detectors. Thus, the probability of each detector being over the correct bound is increased or the probability of a false alarm or miss is reduced for each detector. This arrangement results in a slight increased dwell in average decision time over the average dwell time of the case where unmodified sequential detectors are used but the probabilities of making incorrect decisions have been reduced from that initially set by detector adjustment. Thus, decision bounds can be chosen such that the average decision time and the error probabilities are all smaller for the modified sequential detectors and for the modified case. Tables I and II illustrate these points.

BINOMIAL PARALLEL TESTS

Table I

|  | Decision Time | | Error Probabilities | |
|---|---|---|---|---|
|  | Target Present | Noise only | | |
| Unmodified | 11.976 | 11.751 | .002955 | .005609 |
| Forced Continuation | 11.673 | 11.514 | .002656 | .005184 |

Table II

|  | Decision Time | | Error Probabilities | |
|---|---|---|---|---|
|  | Target Present | Noise only | | |
| Unmodified | 27.859 | 29.111 | .0004522 | .0005660 |
| Forced Continuation | 27.090 | 28.233 | .0003359 | .0005260 |

Table I: $p_0 = .17082$, $p_1 = .67523$
Table II: $p_0 = .17082$, $p_1 = .55486$ where $p_0$ is the value of $p_a$ or $p_b$ when a signal is present and $p_1$ is the value of $p_a$ or $p_b$ when noise only is present.

In order to better understand the technique employed, a mathematical analysis of the forced continuation test follows.

Suppose that a forced continuation test is performed by two detectors. The forced continuation test referred to comprises the following: The bank of sequential detectors is formed to perform the decision making process until all sequential detectors have made a decision for noise or a decision for signal. This is in distinction to the ordinary continuation test where each of the sequential detectors, upon reaching a decision for signal or decision for noise, would stop performing the decision process. On each trial of the test an observation consisting of two sample points is made, and the input to each detector is the information as to whether or not the respective sample point resulted in a success. (A success could correspond to the event that the radar receiver voltage exceeds a quantizing level. The term success is used only for convenience in analysis.) Let $p_a$ be the probability of a success on any single trial for detector A and $p_b$ the probability of a success for detector B.

The integers $a(m)$ and $b(m)$ are the upper and lower decision bounds respectively on the $m$th trial. If, when the testing ends, the number of successes for a particular detector equals or exceeds $a(m)$, a "signal present" decision is made in that detector. Similarly, if the number of successes equals or is less than $b(m)$, a "noise only" decision is made.

The two decisions are made, i.e., the testing ends, when for the first time the two following conditions are met (1) $i \leq b(m)$ or $i \geq a(m)$ (2) $j \leq b(m)$ or $j \geq a(m)$ where on the $m$th trial $i$ is the number of sucesses for the A detector and $j$ is the number of successes for the B detector.

For a particular detector, let $\alpha$ be the probability of making the "signal present" decision when there is noise only, and $\beta$ the probability of making the "noise only" decision when a signal is present.

Note that $\alpha$ and $\beta$ could each have two values, depending on the input to the other detector. We will restrict our definitions to the case where the other detector's input is noise.

If we are given $a(m)$, $b(m)$, $p_a$, $p_b$, we can find by the following equations the error probabilities $\alpha$ and $\beta$ for each of the two detectors (for the situation considered here, both detectors will have the same errors), the distribution of sample size, and the average sample size.

Let $q_m(i, j)$ be the joint probability that on the $m$th trial there are $i$ successes for the A detector and $j$ successes for the B detector and that there has been no decision prior to the $m$th trial.

Then if we let $$\delta_m(u, v) = 1 \quad \text{if } u \geq a(m) \text{ or } u \leq b(m)$$
$$\text{and } v \geq a(m) \text{ or } v \leq b(m)$$
$$= 0 \quad \text{otherwise, i.e., if } (b(m) < u < a(m) b(m) < v < a(m))$$

we have, by summing the probabilities of the four ways in which we can have $i$ and $j$ successes on the two tests with no prior decision $$q_m(i, j) = p_a p_b q_{m-1}(k-1, j-1) \delta_{m-1}(i-1, j-1)$$
$$+ p_a(1-p_b) q_{m-1}(i-1, j) \delta_{m-1}(i-1, j)$$
$$+ (-p_a) p_b q_{m-1}(k, j-1) \delta_{m-1}(i, j-1)$$
$$+ (1-p_a)(1-p_b) q_{m-1}(i, j) \delta_{m-1}(i, j)$$

Let the probability of making the lower decision be $L_a$ for detector A and $L_b$ for detector B. Then by summing the probabilities of all possible ways in which we can make the lower decision on detector A, we have $$L_a = \sum_{m=1}^{\infty} \sum_{\substack{i \leq b(m)}} \sum_{\substack{j \geq a(m) \\ \text{or} \leq b(m)}} q_m(i, j)$$

and for test B $$L_b = \sum_{m=1}^{\infty} \sum_{\substack{i \geq a(m) \\ \text{or} \leq b(m)}} \sum_{j \leq b(m)} q_m(i, j)$$

By noting certain identities, these summations can be simplified and optional equations can be computed as a check. These will not be given here.

If $p_1$ is the value that $p_a$ or $p_b$ has when a signal is present and $p_0$ is the value when noise only is present, then for the A detector $$\beta = L_a \text{ for } p_a = p_1, p_b = p_0$$
$$\text{and } \alpha = 1 - L_a \text{ for } p_a = p_b = p_0$$

and for the B detector $$\beta = L_b \text{ for } p_a = p_0, p_b = p_1$$
$$\text{and } \alpha = 1 - L_b \text{ for } p_a = p_b = p_0$$

Let $f(m)$ be the probability of making a decision on the $m$th trial. Then $$f(m) = \sum_{\substack{i \leq b(m) \\ \text{or} \geq a(m)}} \sum_{\substack{j \leq b(m) \\ \text{or} \geq a(m)}} q_m(i, j)$$

Let $\bar{m}$ be the expected number of trials, i.e., the average sample size (proportional to dwell time).

$$\bar{m} = \sum_{m=1}^{\infty} m f(m)$$

The foregoing example is typical of situations where the forced continuation test or modified sequential detector banks can be employed. Each sample point or observation can be visualized as a vector or $n$-tuple where all $n$ components are available whether or not they are used. Addition of Doppler or velocity discrimination in the above radar example will provide another applicable situation. It is applicable to any detection situation where the sample or observation points are inherently available in this form. The sequential detector used in the present invention may be either the kind disclosed in copending application Serial No. 58,855, entitled "Sequential Signal Detector" or copending application Serial No. 144,518, entitled "Binomial Sequential Detector" in that the technique employed is applicable to any sequential detector whether it is based on the sequential probability ratio test or not. The relative performance of the modified and unmodified scheme must, however, depend upon the nature of the particular sequential detector, the false alarm and miss probabilities employed, the signal and noise situations, and the number of detectors in the bank.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A modified sequential detection system having a multiplicity of sequential detectors connected in parallel and adapted to receive signals from a radar system receiver and having decision for signal outputs and decision for noise outputs, the modification comprising; forced continuation means operatively coupled to said decision for signal outputs and decision for noise outputs on each of said sequential detectors so constructed and arranged that each of said sequential detectors continues a sampling process until one of said decision for signal and decision for noise outputs is present at each of said sequential detectors.

2. A modified sequential detection system as set forth in claim 1 and further including; reset means operatively coupled to said forced continuation means and each of said sequential detectors adapted to recycle each of said sequential detectors when said decision for signal and decision for noise is present at each of said sequential detectors.

3. An improved sequential detection system having at least two sequential detectors connected in parallel adapted to receive video and range information from a radar system receiver, the modification comprising; coincidence means operatively adapted to receive the outputs of said sequential detectors for generating an output therefrom when the outputs from said sequential detectors are coincident in said coincidence means, other coincidence means adapted to receive the outputs from said sequential detectors and operatively coupled to the output of said first mentioned coincidence means for producing a signal decision or noise decision when outputs from said sequential detector means and the output from said first mentioned coincidence means are coincident therein.

4. An improved sequential detection system having; at least two sequential detectors connected in parallel and adapted to receive video information from a radar system receiver and having a decision for signal output and a decision for noise output, the modification comprising decision for signal coincidence means having inputs and an output and having one input operatively coupled to said decision for signal output on one of said sequential detectors, decision for noise coincidence means having inputs and an output and having one input operatively coupled to said decision for noise output on one of said sequential detectors, other coincidence means operatively coupled to each of said decision for signal output and decision for noise output on said sequential detectors for generating an output pulse when one of a decision for noise and decision for signal from each of said sequential detectors is coincident therein, one input on said decision for noise coincidence means being operatively coupled to the output of said other coincidence means, one input on said decision for signal coincidence means being operatively coupled to the output of said other coincidence means, said output of said other coincidence means furnishing an enabling pulse for said decision for signal coincidence means and said decision for noise coincidence means so that said sequential detectors are forced to continue until a decision is present at the output of each said sequential detector.

5. An improved sequential detection system as set forth in claim 4 wherein said decision for signal coincidence means, decision for noise coincidence means, and other coincidence means comprise And gates.

6. An improved sequential detection system as set forth in claim 4 and further including; signal isolating means having inputs and an output operatively connected between said decision for signal output and decision for noise output on each of said sequential detectors and said other coincidence means.

7. An improved sequential detection system as set forth in claim 6 and further including; reset means operatively connected between the output of said other coincidence means and each of said sequential detectors for recycling each of said sequential detectors upon an output being present at said other coincidence means.

No references cited.